Patented July 6, 1926.

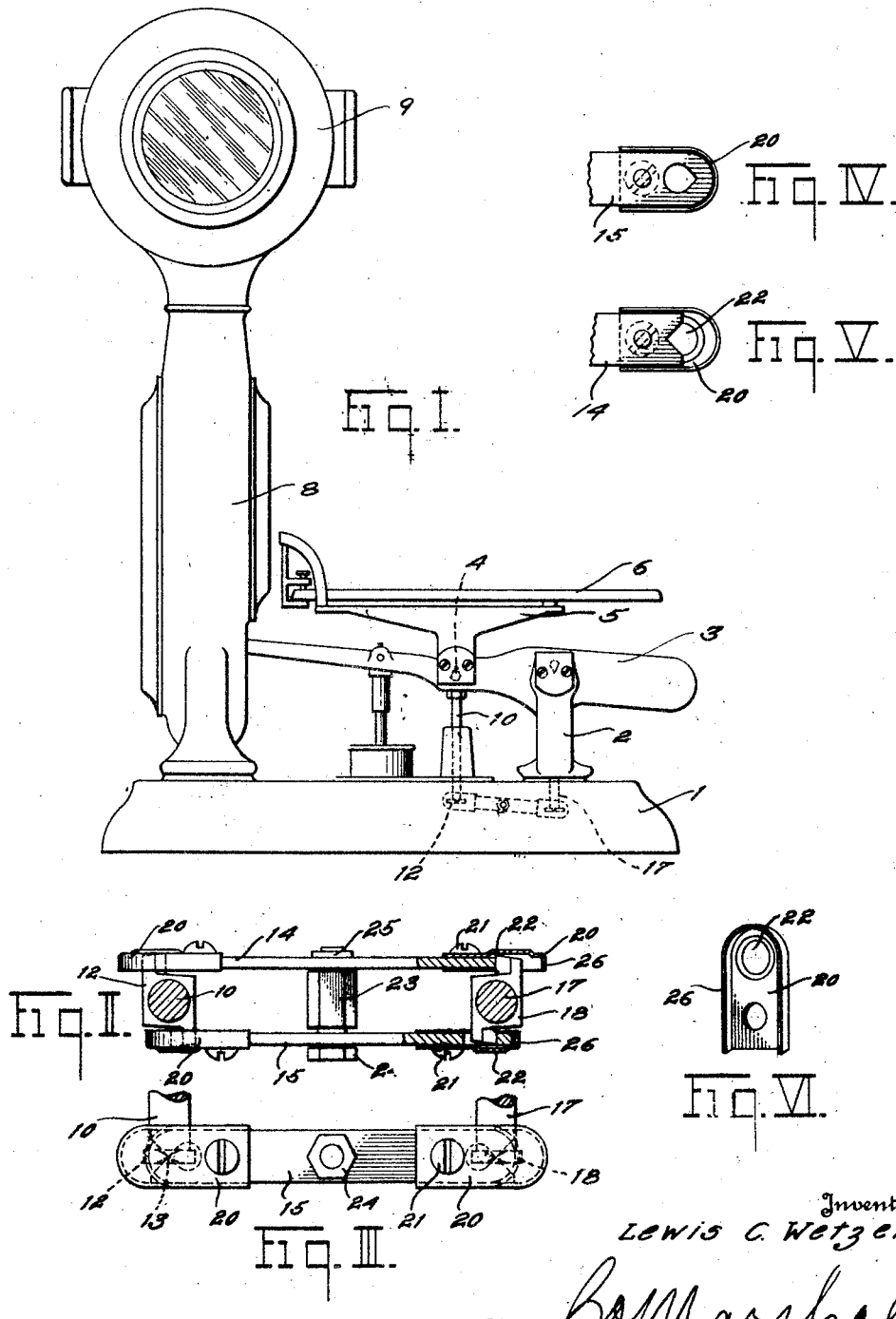

1,591,594

UNITED STATES PATENT OFFICE.

LEWIS C. WETZEL, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed September 2, 1925. Serial No. 54,009.

This invention relates to weighing scales, and more particularly to the means employed for stabilizing pivotally mounted members.

One of the salient features of this invention is to improve the means for preventing the platform or commodity-receiver from tilting or tipping when a load is placed adjacent one of its edges, this means comprising a plurality of links adapted to engage knife edge members in such a manner that friction set up between these moving parts is reduced to a minimum.

Another object of the invention is the provision of a platform stabilizing means comprising a pair of links engaging transversely positioned knife edges, the links having thrust plates for the knife edges, the thrust plates also serving the purpose of limiting the lateral movement of said links.

Still another object of the invention is the provision of a thrust plate for knife edge members which is inexpensive to manufacture and one which is rendered easily removable for purposes of repair or replacement.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale of a well known type embodying my invention;

Figure II is an enlarged detail plan view of the improved check link, parts being shown in section;

Figure III is an elevational view of my improved check link;

Figure IV is a fragmentary detail view showing one end of the tension link;

Figure V is a fragmentary detail view showing one end of the compression link; and Figure VI is a detail isometric perspective view of the thrust plate forming an element of my invention.

Referring to the drawings in detail, I have shown the platform stabilizing means of my invention incorporated in a counter scale of the cylinder type, but it is to be clearly understood that I contemplate the use of my invention in other types of scales wherever it may be found applicable. As the scale per se forms no part of the present invention, I will only describe it in such detail as to show the application of my invention thereto. The scale comprises a substantially hollow base 1, one end being provided with an upwardly projecting fulcrum stand 2 upon which is suitably fulcrumed the main lever 3 of the scale. The lever 3 is provided with load pivots 4 which support a spider 5 surmounted by a commodity-receiver or platform 6. The nose end of the lever 3 projects into an upright housing 8 erected upon the base 1 and is connected to the load-counterbalancing mechanism (not shown), which may be of any suitable type, and to the indicating mechanism (also not shown) located in the cylindrical housing 9 surmounting the upright housing 8.

The means for stabilizing or maintaining the commodity-receiver level throughout weighing movements irrespective of the position of the load thereon forms the principal part of this invention and will now be described in detail.

The platform spider 5 is provided with a depending stem 10, which is provided at its lower extremity with a member 12 formed with a pair of oppositely disposed aligned knife edges 13 which engage the extremities of links 14 and 15, the arrangement being clearly illustrated in Figures II and III. The base horn 2 is provided with a depending stud 17, and secured to its lowermost extremity is a member 18 identical in construction with the member 12 having aligned knife edges engaging the other extremities of the links 14 and 15, thus forming a "push and-pull" connection between the spider stem 10 and stud 17. The links are loosely connected together intermediate their ends by means of a polygonally shaped member 23 having tenons normally passing through openings in the links, a nut 24 and a collar 25 serving to prevent excessive derangement of the links.

The extremities of the links are provided with thrust plates or caps 20 which are secured thereto by means of screws 21, the plates 20 having substantially circular raised portions 22 which provide suitable end thrusts for the knife edges of the members 12 and 17, as well as to limit the lateral movement of the links and prevent an abnormal derangement of the parts. The plates are preferably formed with peripheral flanges 26 which are received over the edges of the links 14 and 15 and prevent accidental shifting of the plates. It is obvious that the thrust plates may be easily and inexpensively formed out of sheet metal, and the plates, being of the same form, are completely interchangeable with either the push or pull links. The opposite ends of the knife edges of the members 12 and 17 are tapered to a point so that should these members engage the thrust plates no appreciable friction will be set up between the parts.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, weighing mechanism having relatively movable elements, knife edge members secured to said relatively movable elements, means including a link pivotally connecting said knife edge members, and means carried by the link for limiting the lateral movement thereof relative to said knife edge members.

2. In a device of the class described, in combination, weighing mechanism having relatively movable elements, knife edge members secured to said relatively movable elements, means including a pair of links pivotally connecting said knife edge members, and means including a plurality of thrust plates for limiting the lateral movement of said links.

3. In a device of the class described, in combination, weighing mechanism having relatively movable elements, knife edge members secured to said relatively movable elements, means including a plurality of links pivotally connecting said knife edge members, and thrust plates secured to said links adjacent said knife edges for limiting lateral movement of said links relative to said knife edges.

4. In a device of the class described, in combination, a frame, weighing mechanism supported upon said frame, a commodity-receiver supported upon said weighing mechanism, stabilizing means for said platform comprising knife edge members secured to said frame and said commodity-receiver, links connecting said knife edge members, said links being loosely connected together, and thrust plates secured to said links adjacent said knife edges for limiting the lateral movement of said links relative to said knife edges.

5. In a weighing scale, in combination, a frame, lever mechanism supported upon said frame, a platform supported upon said lever mechanism, members secured to said frame and said platform having oppositely disposed aligned knife edges, links connecting said knife edges, means connecting said links together, and thrust plates removably secured to said links and adapted to co-operate with said knife edges to limit the lateral movement of said links relative to said knife edge members.

6. In a weighing scale, in combination, a frame, lever mechanism supported upon said frame, a platform supported upon said lever mechanism, members secured to said frame and lever mechanism having oppositely disposed aligned knife edges, links connecting the knife edges of said members to form a "push and pull" connection, and thrust plates secured to said links adapted to co-operate with said knife edge members to limit the lateral movement of said links relative to said members.

7. In a weighing scale, in combination, a frame, lever mechanism supported upon said frame, a platform supported upon said lever mechanism, members secured to said frame and lever mechanism having oppositely disposed aligned knife edges, a pair of links connecting the knife edges of said members forming a "push and pull" connection therebetween, and thrust plates having laterally projecting flanges removably secured to said links and adapted to co-operate with said knife edges to limit the lateral movement of the links relative to said knife edge members.

8. In a weighing scale, in combination, a frame, a lever fulcrumed upon said frame, a commodity-receiver pivotally supported upon said lever, means connected to said frame and said commodity-receiver having oppositely disposed knife edges, links connecting said knife edges, and a plurality of thrust plates having laterally projecting flanges removably secured to said links.

9. In a device of the class described, in combination, weighing mechanism having relatively movable elements, knife edge members secured to said elements, links connecting the knife edges of said members, and means including a plurality of plates secured to said links forming thrust members for said knife edges.

LEWIS C. WETZEL.